(12) United States Patent
Pleiman

(10) Patent No.: US 11,843,835 B2
(45) Date of Patent: Dec. 12, 2023

(54) LIVE TELEVISION AUGMENTED WITH ACCOUNT-SPECIFIC DATA

(71) Applicant: DISH Network L.L.C., Englewood, CO (US)

(72) Inventor: Eric Pleiman, Centennial, CO (US)

(73) Assignee: DISH Network L.L.C., Englewood, CO (US)

( * ) Notice: Subject to any disclaimer, the term of this patent is extended or adjusted under 35 U.S.C. 154(b) by 75 days.

(21) Appl. No.: 17/359,074

(22) Filed: Jun. 25, 2021

(65) Prior Publication Data

US 2022/0417603 A1 Dec. 29, 2022

(51) Int. Cl.
| | |
|---|---|
| *H04N 21/478* | (2011.01) |
| *H04N 21/2665* | (2011.01) |
| *H04N 21/2187* | (2011.01) |
| *H04N 21/258* | (2011.01) |
| *G06F 3/0485* | (2022.01) |

(52) U.S. Cl.
CPC ......... *H04N 21/478* (2013.01); *G06F 3/0485* (2013.01); *H04N 21/2187* (2013.01); *H04N 21/25875* (2013.01); *H04N 21/2665* (2013.01)

(58) Field of Classification Search
CPC ............ H04N 21/478; H04N 21/2187; H04N 21/25875; H04N 21/2665
See application file for complete search history.

(56) References Cited

U.S. PATENT DOCUMENTS

| | | | | |
|---|---|---|---|---|
| 2010/0041482 | A1* | 2/2010 | Kumar | G06Q 40/04 463/42 |
| 2015/0312637 | A1* | 10/2015 | Maisenbacher | H04N 21/44008 725/32 |
| 2016/0163158 | A1* | 6/2016 | Arnone | G07F 17/3225 463/25 |
| 2021/0089779 | A1* | 3/2021 | Chan | H04N 21/472 |
| 2022/0014915 | A1* | 1/2022 | Chauhan | H04L 65/61 |
| 2022/0157127 | A1* | 5/2022 | Tadepalli | H04N 21/458 |

* cited by examiner

*Primary Examiner* — Kyu Chae
(74) *Attorney, Agent, or Firm* — KILPATRICK TOWNSEND & STOCKTON, LLP

(57) ABSTRACT

Various arrangements for augmenting live television are presented herein. Active wager information mapped to user account credentials can be received. The active wager information can indicate a wager that have been made with a separate electronic sportsbook provider system. A current live sports event being output for presentation at a content output device can be identified. A listing of wagers to be output for presentation at least partially based on the current live sports event being output for presentation at the content output device and the active wager information can be generated. Presentation of the current live sports event being output for presentation at the content output device can be augmented based on the listing of the wagers.

14 Claims, 7 Drawing Sheets

LIVE TELEVISION AUGMENTED WITH ACCOUNT-SPECIFIC DATA

BACKGROUND

Sports fans tend to watch sporting events live on television. As sports wagering has become legalized in jurisdictions throughout the United States and the world, such sports fans tend to place wagers on both the sporting event being watched live and other sports events occurring simultaneously. Due to technical limitations of sportsbook systems and television service provider system, sports fans tend to have to juggle multiple devices or multiple applications in order to watch sporting events and monitor their wagers.

SUMMARY

Various embodiments are described related to a method for augmenting live television. In some embodiments, a method for augmenting live television is described. The method may comprise providing, by a television service provider system, user account credentials to an electronic sportsbook provider system. The method may comprise receiving, by the television service provider system, active wager information mapped to the user account credentials. The active wager information may indicate one or more wagers that have been made with the electronic sportsbook provider system for a user account corresponding to the user account credentials. The method may comprise determining, by the television service provider system, a current live sports event being output for presentation at a content output device mapped to the user account credentials. The method may comprise generating, by the television service provider system, a listing of one or more wagers to be output for presentation at least partially based on the current live sports event being output for presentation at the content output device and the active wager information. The method may comprise augmenting presentation of the current live sports event being output for presentation at the content output device with the listing of one or more wagers.

Embodiments of such a method may include one or more of the following features: the listing of the one or more wagers may comprise a wager on the current live sports event being output for presentation. The method may further comprise determining a historical live sports event viewing history associated with the user account. Generating the listing of the one or more wagers may be based at least in part on the historical live sports event viewing history. The listing of the one or more wagers may comprise at least one recommended wager based on the historical live sports event viewing history. The listing of the one or more wagers may comprise at least one recommended wager based on historical wagers previously placed by the user account. Augmenting presentation of the current live sports event being output for presentation may comprise a scrolling interface being presented simultaneously with the current live sports event. The listing of the one or more wagers may comprise a recommended prop bet for the current live sports event. The method may further comprise determining a channel change command has been received. The method may further comprise determining, by the television service provider system, a second current live sports event being output for presentation at the content output device mapped to the user account credentials following the channel change command. The method may further comprise generating, by the television service provider system, a second listing of one or more wagers to be output for presentation at least partially based on the second current live sports event being output for presentation at the content output device and the active wager information. The method may further comprise augmenting presentation of the second current live sports event being output for presentation at the content output device with the second listing of one or more wagers. The listing of one or more wagers, as output for presentation, may intersperse potential wagers with active wagers of the user account. The method may further comprise transmitting, by the television service provider system, the currently live sports event and the listing of the one or more wagers to the content output device via satellite.

In some embodiments, an augmented live television system is described. The system may comprise a television service provider system that may communicate with an electronic sportsbook provider system and a plurality of television receivers. The television service provider system may be configured to provide user account credentials to the electronic sportsbook provider system. The television service provider system may be configured to receive active wager information mapped to the user account credentials. The active wager information may indicate one or more wagers that have been made with the electronic sportsbook provider system for a user account corresponding to the user account credentials. The television service provider system may be configured to determine a current live sports event being output for presentation at a content output device mapped to the user account credentials. The television service provider system may be configured to generate a listing of one or more wagers to be output for presentation at least partially based on the current live sports event being output for presentation at the content output device and the active wager information. Presentation of the current live sports event being output for presentation at the content output device may be augmented with the listing of one or more wagers.

Embodiments of such a method may include one or more of the following features: the augmented live television system may further comprise the content output device. The content output device may be configured to output the current live sports event augmented with the listing of one or more wagers for presentation. The listing of the one or more wagers may comprise a wager on the current live sports event being output for presentation by the content output device. The content output device may be a television receiver of the plurality of television receivers that may receive the current live sports event via satellite. The content output device may be a streaming device that receives the current live sports event via the Internet. The television service provider system may be further configured to determine a historical live sports event viewing history associated with the user account. The television service provider system being configured to generate the listing of the one or more wagers may be based at least in part on the historical live sports event viewing history. The listing of the one or more wagers may comprise at least one recommended wager based on the historical live sports event viewing history. The listing of the one or more wagers may comprise at least one recommended wager based on historical wagers previously placed by the user account. The listing of the one or more wagers may comprise a recommended prop bet for the current live sports event. The system may be further configured to determine a channel change command has been received. The system may be further configured to determine a second current live sports event being output for presentation at the content output device mapped to the user account credentials following the channel change command.

The system may be further configured to generate a second listing of one or more wagers to be output for presentation at least partially based on the second current live sports event being output for presentation at the content output device and the active wager information. The content output device may augment presentation of the second current live sports event being output for presentation with the second listing of one or more wagers.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Embodiments detailed herein focus on live television content presentation along with integrated sports wagering (or sports betting) information. The integrated sports wagering information is based on actual wagers placed in association with an electronic sportsbook account mapped to a television service provider user account. This arrangement allows for a user to view betting information specifically tailored to wagers placed by the user. Additionally, prospective wagers that the user may be interested in placing can be presented. This prospective wager information can be based on the live sporting event that the user is currently viewing. In a conventional arrangement, an electronic sportsbook would have no system implemented that would allow visibility into what the user is currently viewing. However, by integrating a sportsbook system with a television service provider system, information about the user's current viewing and historical viewing can be used to target presentation of wager information to the user.

The wager information can be presented in various formats. In some possible embodiments, the user's active wagers (wagers which the user has made and for which the live sporting event is in-progress), along with one or more potential wagers that may be of interest to the user, may be presented in a scrolling interface. This scrolling interface can be updated dynamically based on the live content currently being output for viewing. This interface can also be updated based on historic viewing by the user and historic wagering by the user. In other embodiments, interfaces that use visual mechanisms other than scrolling may be used, such as multiple "pages" of wager information may be presented.

Figure 1:
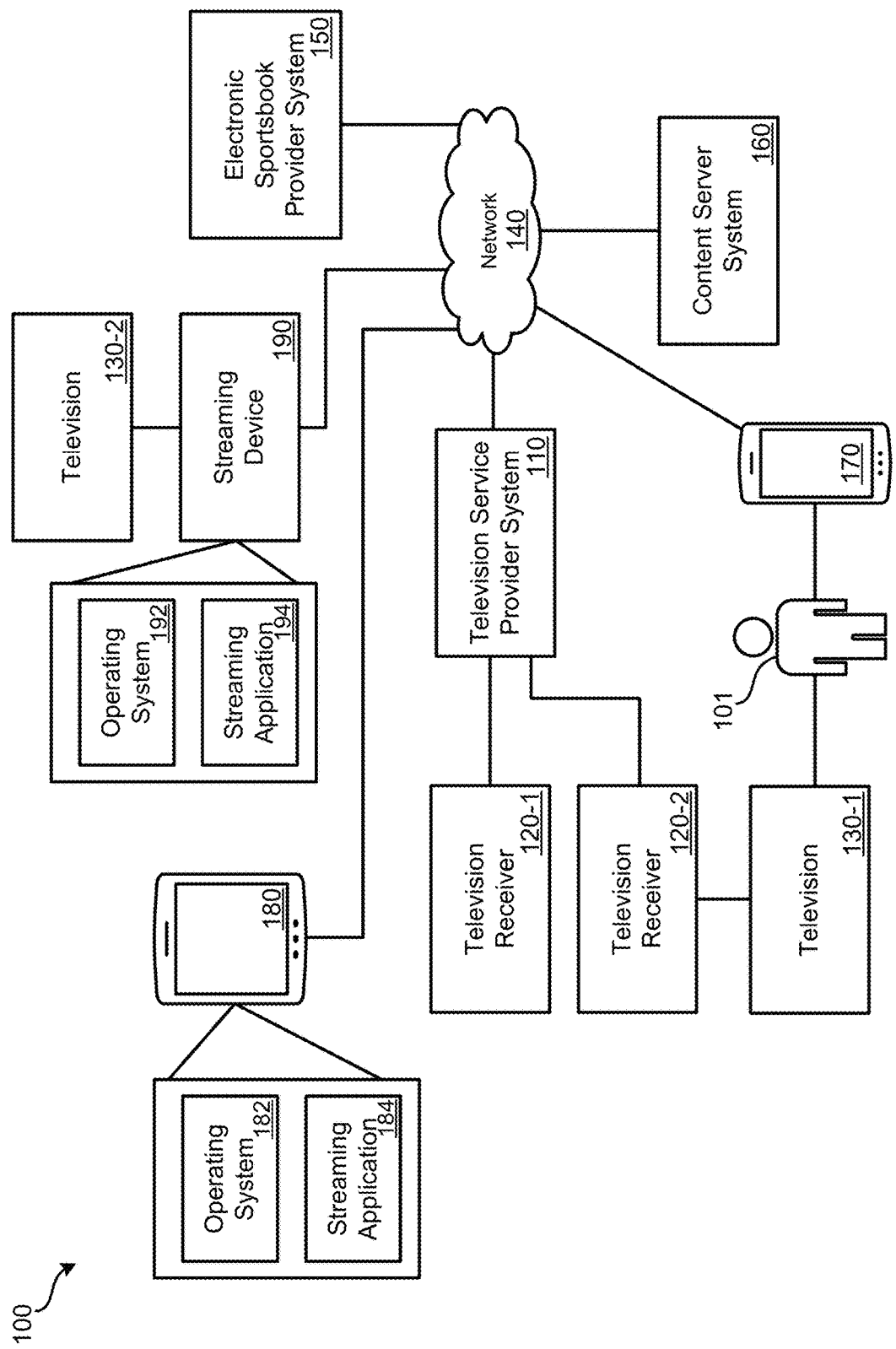
FIG. 1 illustrates a television service provider system with electronic sports integration.

Such embodiments and other possible embodiments are detailed in relation to the figures. FIG. 1 illustrates a television service provider system with electronic sports integration system 100 ("system 100"). System 100 can include: television service provider system 110; television receivers 120 (120-1, 120-2); televisions 130 (130-1, 130-2); network 140; electronic sportsbook provider system 150 ("sportsbook system 150"); content server system 160; mobile device 170; computerized device 180; and streaming device 190. Person 101 can also be referred to as a "television viewer" or "user."

Television service provider system 110 may broadcast live television programming to television receivers 120 and/or transmit live television programming as a streaming service via the Internet to computerized devices and streaming devices. "Live" television programming refers to television programming that is transmitted substantially contemporaneously with the event occurring. Live television programming may include a delay of up to several minutes. For instance, a sporting event that is broadcast with a delay of up to a few minutes, such as to edit out offensive audio, qualifies as live television programming. Such live television programming may be received from various content providers, then relayed by television service provider system 110 to television receivers 120 via a television distribution network and/or as an over-the-top (OTT) service to computerized and/or streaming devices via the Internet (or some other public network). Streams of many television channels may be broadcast live via various types of television programming distribution networks, such as a satellite-based network, a cable-based network, an IP-based network, or an OTT television distribution network. In addition to streaming live television channels, television service provider system 110 may transmit on-demand content, applications for execution, electronic programming guide (EPG) data, metadata, and other services ancillary to live television programming. Further detail regarding a possible embodiment of television service provider system 110 is provided in relation to FIG. 2.

While two television receivers 120 are presented, this number of television receivers is merely for illustration—many more television receivers may receive live television programming from television service provider system 110 in other embodiments. A television receiver, such as television receiver 120-2, may be integrated as part of a television or other form of display device or may be a separate device, such as a set top box (STB), that receives data from television service provider system 110 and outputs the data for presentation, such as to television 130-1. The data received by a television receiver may be scrambled or encrypted and the television receiver may only have authorization to decode/descramble particular television channels and/or particular groups of television channels based on a rights scheme assigned to the user account mapped to the television receiver.

Additionally or alternatively, some other form of device that is capable of outputting television programming for presentation may be used instead of television receivers 120. For instance, television programming, such as a live sporting event, may be distributed over network 140 (e.g., including the Internet). Computerized device 180, such as a smartphone, gaming device, or tablet computer may be used to view the television programming. The same computerized device may be used to interact with electronic sportsbook provider system 150. Computerized device 180 may execute operating system 182. A user may install streaming application 184 on computerized device 180, which permits the user to use a user account to access television service provider system 110 via network 140. The user may be permitted to view any television channel via computerized device 180 for which the user account is presently authorized, such as due to a subscription or other grant of rights.

Streaming device 190 can represent a computerized device that does not directly output video. For instance, streaming device 190 may be plugged into a port of television 130-2, which can be used to output video and/or audio. Similar to computerized device 180, streaming device 190 can execute operating system 192 using one or more processors. Streaming application 194 may be installed on streaming device 190, which can allow television programming streams output by television service provider system 110 to be presented on television 130-2.

Television service provider system 110 may use a dedicated television-distribution network to communicate with television receivers 120. Additionally or alternatively, network 140 may be used to communicate with television receivers 120 and/or electronic sportsbook provider system 150, and content server system 160. Network 140 may include one or more public and/or private networks, which can include the Internet.

Electronic sportsbook provider system 150 may be operated by an entity that is distinct from the entity operating television service provider system 110. Electronic sportsbook provider system 150 may host various wagers and may be used to set the odds on such wagers. A person located in a jurisdiction that permits sports gaming and is of legal age may be permitted to place a wager via electronic sportsbook provider system 150. A person may be able to access electronic sportsbook system 150 using a computerized device, such as mobile device 170. Mobile device 170 may allow television viewer 101 to access electronic sportsbook system 150 via an application installed on mobile device 170 or by using a web browser on mobile device 170 to access the website of electronic sportsbook provider system 150. Mobile device 170 may be a smart phone, gaming device, tablet computer, laptop computer, cellular phone, desktop computer, personal digital assistant, or some other form of computerized device.

Television service provider system 110 may be able to bi-directionally communicate with electronic sportsbook provider system 150 via network 140. A user may provide television service provider system 110 with login information (e.g., user name, password) for the user's account with sportsbook system 150. This login information can be used by television service provider system 110 to access electronic sportsbook system 150 and retrieve an indication of various wagers and the associated odds with such wagers to television service provider system 110. This wager information can include: current active wagers of the user; historical wagers of the user; potential wagers that the sportsbook provider wants to promote to the user; wagers popular in the user's geographic region; and/or wagers available for a particular sporting event. Television service provider system 110 may relay such wager information to television receivers 120, streaming application 184, and/or streaming application 194.

In some embodiments, television service provider system 110 requests or retrieves particular wager information from electronic sportsbook provider system 150. Additionally or alternatively, content viewing information associated with the user's television service provider account may be provided to electronic sportsbook provider system 150 and system 150 may make the decision on wager information to be presented to the user. For example, in response to the electronic sportsbook provider system 150 receiving an indication that a user account is currently viewing a particular live sporting event, the electronic sportsbook provider system 150 may determine to have a particular prop bet related to the live sports event presented to the user. Electronic sportsbook provider system 150 may select the particular wagers to be presented to the user based on: the user's wager history; amounts the user typically wagers; the user's active wagers; the user's geographic location; user's team affiliations; the amount of funds available in the user's account; wagers the sportsbook provider wants user to make (e.g., load balancing on both sides of an outcome) and/or current promotions of electronic sportsbook provider system 150.

Content server system 160 may provide content information to television service provider system 110 and electronic sportsbook provider system 150. For example, content server system 160 may provide details on the sporting event, such as the television channel, the date, the scheduled start time and scheduled end time of the sporting event on the television channel, details of the teams and players participating in the sporting event (e.g., team records, player-specific statistics), the location of the sporting event, and/or other details of the sporting event. Such data may be used by television service provider system 110 to populate an electronic programming guide (EPG).

Television viewer 101 may be using television 130 to view the sporting event. The sporting event may be received as live television programming by television receiver 120-2 from television service provider system 110. Television viewer 101 may use a remote control to interact with television receiver 120-2. In some embodiments, some other form of electronic device may be used, such as a computerized mobile device or smartphone. A sports gaming interface can be output concurrently with television programming, such as the live sporting event being viewed by television viewer 101, that allows for viewing of the user's current wagers and prospective wagers (which are defined as wagers that are available to be made, but have not yet been placed by the user) the user may be interested in making. The sports gaming interface may function as an application that is installed on television receiver 120-2. A similar interface may be presented via streaming applications 184 and 194.

Television viewer 101 may also be using mobile device 170. Television viewer 101 may, via the sports gaming interface output by television receiver 120-2, trigger one or more staged wagers to be transmitted to mobile device 170. In such embodiments, the sports gaming interface executed by television receiver 120-2 may transmit a pre-staged wager, which can include an indication of the one or more wagers (a wage identifier) and an account identifier to television service provider system 110. Television service provider system 110 relays this information to electronic sportsbook provider system 150 via network 140. Alternatively, the sports gaming interface may use an application programming interface (API) to relay an indication of the one or more wagers to the electronic sportsbook provider system 150 (without communicating through television service provider system 110). Electronic sportsbook provider system 150 may then be triggered to transmit a link or notification to mobile device 170. In some embodiments, a pop-up notification is presented on mobile device 170 that can be selected by television viewer 101. Selection of such notification may cause a website or application executed by mobile device 170 to launch that will include the pre-staged wagers set up by television viewer 101 via the sports gaming interface output by television receiver 120-2. In other embodiments, a link may be sent, such as via text message or email, to mobile device 170. Again here, selecting the link may cause a website or application executed by mobile device 170 to launch that will include the pre-staged wagers set up by television viewer 101 of the sports gaming interface output by television receiver 120-2. Television viewer 101 may then edit, fund, and/or otherwise complete the pre-staged wagers set up via the sports gaming interface. Similarly, television viewer 101 may interact with mobile device 170 to complete a bet similarly when viewing television channels via computerized device 180 and/or streaming device 190.

In some embodiments, television receiver 120-2 can communicate with mobile device 170. After television viewer 101 has pre-staged one or more wagers using the sports gaming interface output by television receiver 120-2, television viewer 101 can trigger presentation of a machine-readable code, such as a barcode or QR (Quick Response) code, to be output by television receiver 120-2 and presented via television 130. The machine-readable code may be read by mobile device 170 using an application for reading machine-readable codes or functionality integrated into a sports gaming application associated with electronic sportsbook provider system 150. The machine-readable code may have identifiers of the staged wagers embedded. These identifiers may be used by electronic sportsbook provider system 150 to cause mobile device 170 to present the staged wagers and allow television viewer 101 to edit, fund, and/or otherwise complete the pre-staged wagers.

Alternatively, an indication of such bets and an associated identifier may be transmitted by television receiver 120-2 to television service provider system 110, which may relay the information to electronic sportsbook provider system 150. The associated identifier may be embedded in the machine-readable code and may be acquired by mobile device 170 by imaging the machine-readable code. The associated identifier may then be transmitted by mobile device 170 to electronic sportsbook provider system 150 to retrieve the staged wagers that are mapped to the identifier.

Figure 2:
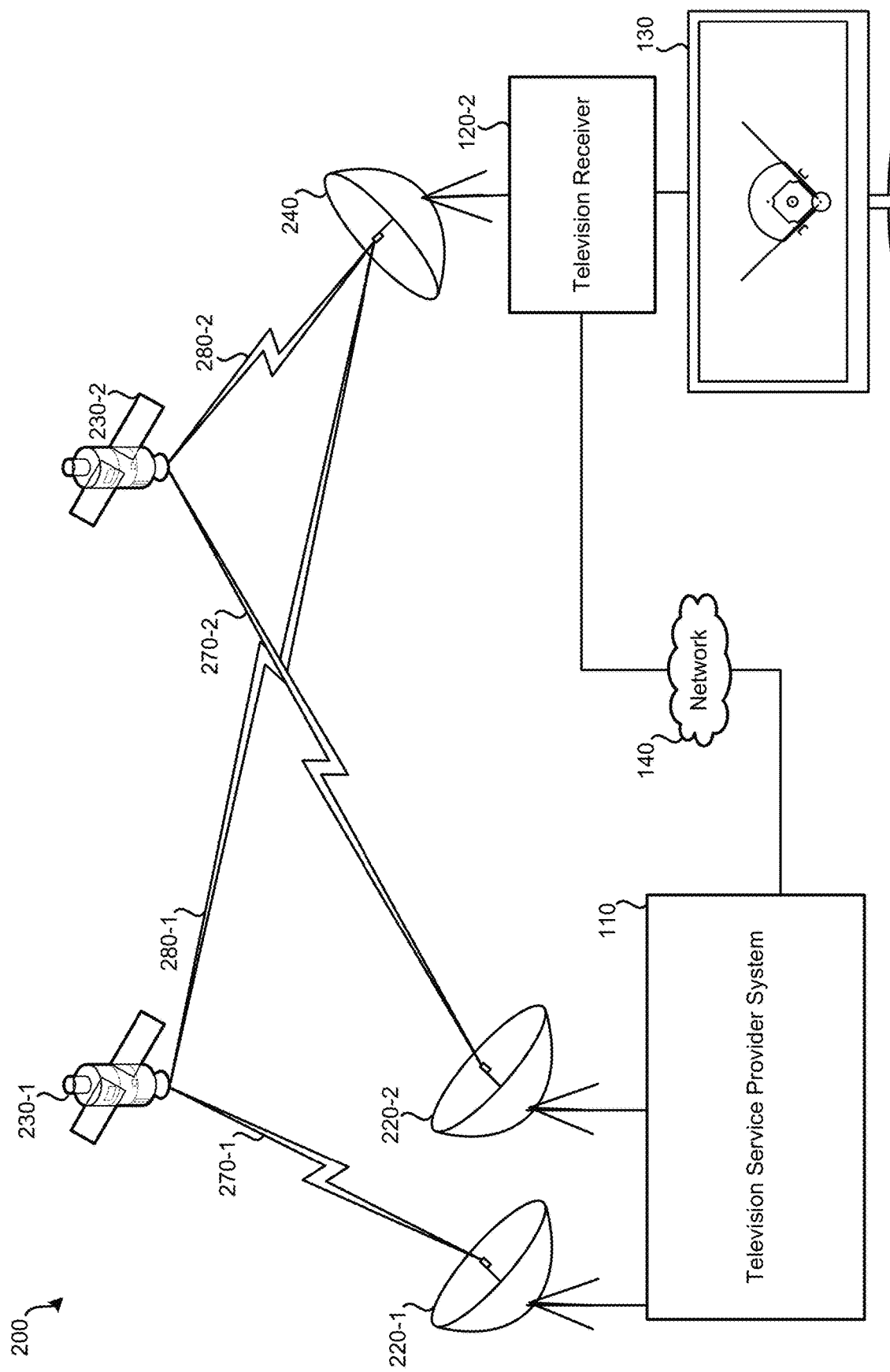
FIG. 2 illustrates an embodiment of a satellite-based television distribution network.

FIG. 2 illustrates an embodiment of a satellite-based television distribution system 200. Satellite-based television distribution system 200 may include: television service provider system 110, satellite transmitter equipment 220, satellites 230, satellite antenna 240, television receiver 120-2, and television 130. Alternate embodiments of satellite-based television distribution system 200 may include fewer or greater numbers of components. While only one satellite antenna 240, television receiver 120-2, and television 130 (which can collectively be referred to as "user equipment") are illustrated, it should be understood that multiple (e.g., tens, thousands, millions) instances of user equipment may receive television signals from television service provider system 110 via satellites 230. In the example of FIG. 2, while television service provider system 110 uses satellites to communicate with television receiver 120-2, other forms of television programming distribution networks can be used in other embodiments.

Television service provider system 110 and satellite transmitter equipment 220 may be operated by a television service provider. A television service provider may distribute television channels that distribute live television programming, on-demand programming, pay-per-view (PPV) programming, programming information, data, firmware updates, and/or other content/services to users. Television service provider system 110 may receive feeds of one or more live television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 220 (120-1, 220-2) may be used to transmit a feed of one or more television channels from television service provider system 110 to one or more satellites 230. While a single television service provider system 110 and satellite transmitter equipment 220 are illustrated as part of satellite-based television distribution system 200, it should be understood that multiple instances of transmitter equipment may be used, possibly scattered geographically, to communicate with satellites 230. Such multiple instances of satellite transmitting equipment may communicate with the same or with different satellites. Different television channels may be transmitted to satellites 230 from different instances of transmitting equipment. For instance, a different satellite antenna of satellite transmitter equipment 220 may be used for communication with satellites in different orbital slots.

Satellites 230 may be configured to receive signals, such as streams of television channels, from one or more satellite uplinks such as satellite transmitter equipment 220. Satellites 230 may relay received signals from satellite transmitter equipment 220 (and/or other satellite transmitter equipment) to multiple instances of user equipment via transponder streams. Different frequencies may be used for uplink signals 270 from transponder streams 280. Satellites 230 may be in geosynchronous orbit. Each of the transponder streams transmitted by satellites 230 may contain multiple television channels transmitted as packetized data. For example, a single transponder stream may be a serial digital packet stream containing multiple television channels. Therefore, packets for multiple television channels may be interspersed.

Multiple satellites 230 may be used to relay television channels from television service provider system 110 to satellite antenna 240. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 230-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite antenna 240 may be a piece of user equipment that is used to receive transponder streams from one or more satellites, such as satellites 230. Satellite antenna 240 may be provided to a subscriber for use on a subscription basis to receive television channels provided by the television service provider system 110, satellite transmitter equipment 220, and/or satellites 230. Satellite antenna 240, which may include one or more low noise blocks (LNBs), may be configured to receive transponder streams from multiple satellites and/or multiple transponders of the same satellite. Satellite antenna 240 may be configured to receive television channels via transponder streams on multiple frequencies. Based on the characteristics of television receiver 120-2 and/or satellite antenna 240, it may only be possible to capture transponder streams from a limited number of transponders concurrently. For example, a tuner of television receiver 120-2 may only be able to tune to a single transponder stream from a transponder of a single satellite at a given time. The tuner can then be re-tuned to another transponder of the same or a different satellite. A television receiver 120-2 having multiple tuners may allow for multiple transponder streams to be received at the same time.

In communication with satellite antenna 240 may be one or more television receivers. Television receivers may be configured to decode signals received from satellites 230 via satellite antenna 240 for output and presentation via a display device, such as television 130. A television receiver may be incorporated as part of a television or may be part of a separate device, commonly referred to as a set-top box (STB). Television receiver 120-2 may decode signals received via satellite antenna 240 and provide an output to television 130. FIG. 2 provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television. As such, while FIG. 2 illustrates an embodiment of television receiver 120-2 as separate from television 130, it should be understood that, in other embodiments, similar functions may be performed by a television receiver integrated with television 130.

Television 130 may be used to present video and/or audio decoded and output by television receiver 120-2. Television receiver 120-2 may also output a display of one or more interfaces to television 130, such as an electronic programming guide (EPG). In many embodiments, television 130 is a television. Television 130 may also be a monitor, computer, or some other device configured to display video and, possibly, play audio.

Uplink signal 270-1 represents a signal between satellite transmitter equipment 220 and satellite 230-1. Uplink signal 270-2 represents a signal between satellite transmitter equipment 220 and satellite 230-2. Each of uplink signals 270 may contain streams of one or more different television channels. For example, uplink signal 270-1 may contain a first group of television channels, while uplink signal 270-2 contains a second group of television channels. Each of these television channels may be scrambled such that unauthorized persons are prevented from accessing the television channels.

Transponder stream 280-1 represents a transponder stream signal between satellite 230-1 and satellite antenna 240. Transponder stream 280-2 represents a transponder stream signal between satellite 230-2 and satellite antenna 240. Each of transponder streams 280 may contain one or more different television channels, which may be at least partially scrambled. For example, transponder stream 280-1 may be a first transponder stream containing a first group of television channels, while transponder stream 280-2 may be a second transponder stream containing a different group of television channels. When a television channel is received as part of a transponder stream and is decoded and output to television 130 (rather than first storing the television channel to a storage medium as part of DVR functionality, then later outputting the television channel from the storage medium), the television channel may be considered to be viewed "live."

FIG. 2 illustrates transponder stream 280-1 and transponder stream 280-2 being received by satellite antenna 240 and distributed to television receiver 120-2. For a first group of television channels, satellite antenna 240 may receive transponder stream 280-1 and for a second group of channels, transponder stream 280-2 may be received. Television receiver 120-2 may decode the received transponder streams. As such, depending on which television channels are desired to be presented or stored, various transponder streams from various satellites may be received, descrambled, and decoded by television receiver 120-2.

Network 140 may serve as a primary or secondary communication channel between television service provider system 110 and television receiver 120-2. However, in many instances, television receiver 120-2 may be disconnected from network 140 (for reasons such as because television receiver 120-2 is not configured to connect to network 140 or a subscriber does not desire or cannot connect to network 140). Via such a secondary communication channel, bidirectional exchange of data may occur. As such, data may be transmitted to television service provider system 110 from television receiver 120-2 via network 140. This secondary communication can be used to retrieve information about the current and historic television channels and/or content that has been viewed in association with a television service provider user account. Wager information to be output for presentation can be transmitted from system 100 to television receiver 120-2 via network 140. A wager placed through television receiver 120-2 may be transmitted via network 140 to electronic sportsbook provider system 150 via television service provider system 110. Network 140 may be the Internet. While audio and video services may be provided to television receiver 120-2 via satellites 230, feedback from television receiver 120-2 to television service provider system 110 may be transmitted via network 140. In some embodiments, sports gaming data to populate the sports gaming application may be sent via satellites 230 such that a television viewer can use the sports gaming application even if no internet application is available to television receiver 120-2.

Figure 3:
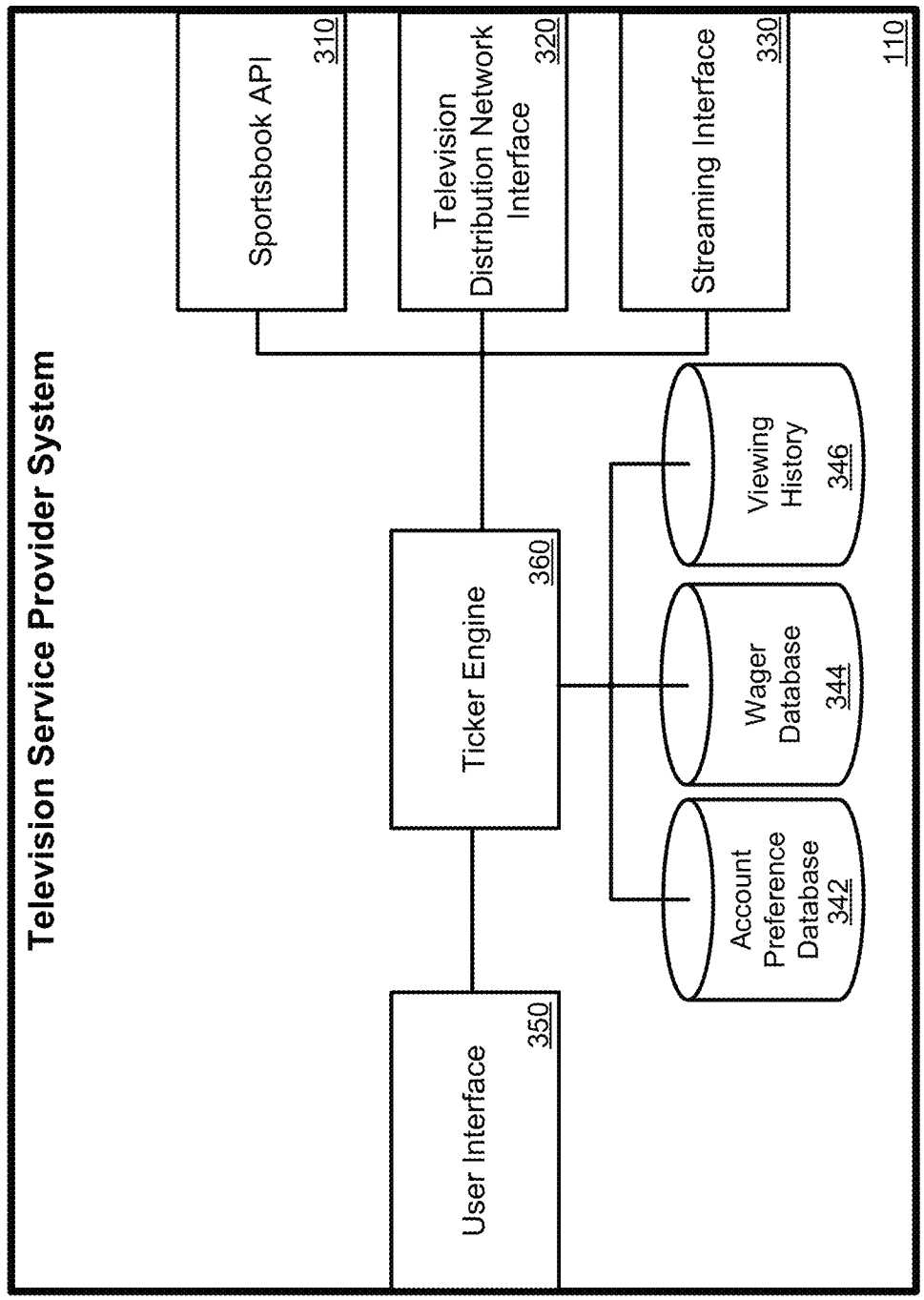
FIG. 3 illustrates an embodiment of a television service provider system.

FIG. 3 illustrates an embodiment of a television service provider system 110. In the illustrated embodiments, only components of system 110 relevant to producing a user-specific wager interface is presented. In other embodiments, components of system 110 may be performed at the "edge"—such as television receivers 120 and streaming application 184 and 194. System 110 can include: sportsbook API 310; television distribution network interface 320; streaming interface 330; ticker engine 360; account preference database 342; wager database 344; viewing history database 346; and user interface 350.

Sportsbook API allows for bidirectional communication with electronic sportsbook provider system 150. Via sportsbook API, login credentials for a user with the sportsbook provider may be transmitted. In response, ticker engine 360 can receive: 1) the user's past, current, and/or future wagers (wagers that have been made by the user, but the sporting event is not yet in progress); 2) prospective wagers that the user may be interested in placing (e.g., based on the user's wagering history with the sportsbook provider; wagers the sportsbook provider is promoting); 3) other wagers available on the sporting event that the user is currently viewing (e.g., in-game prop wagers); and/or 4) prospective wagers that the user for which the user has expressed an interest in at least one of the teams participating (e.g., set a "favorite" team).

Television distribution network interface 320 and streaming interface 330 may be used to both distribute content and provide indications of the wagers to be presented as part of the wagering interface for a specific user account.

Ticker engine 360, in addition to using information received via sportsbook API 310, may use data from account preference database 342, wager database 344, and/or viewing history database 346 to determine the wagers to be presented for a specific user account. User interface 350, which may be accessed via a computerized device (e.g., smartphone, tablet computer) or via the content viewing device if Internet-connected, various user account-specific preferences can be updated. Account preference database 342 may store, for the user's television service provider system account, preferences on presentation of wagers. Preferences that can be set by the user can include: whether or not the user's past (e.g., within a threshold period of time, such as wagers that have completed within the last 24 hours), currently active, and/or future wagers (e.g., within a second threshold period of time, such as wagers that will become active within the next 48 hours) are presented; whether other available wagers for the currently-output sporting event are presented; whether or not available wagers for other in-progress sporting events are present; whether available prop wagers (defined as wagers that are other than odds or moneyline wagers on the final score of a sporting event) are presented; whether or not the user's viewing history for the user's account with the television service provider system is used to suggest wagers; and/or whether or not wagers on sports other than the sport currently being output for presentation is permitted. Other possible customizations by the user are also possible. In some embodiments, which preferences the user is permitted to set may be more limited.

Wager database 344 may store information that was previously-retrieved via sportsbook API 310. For example, wagers that were placed by the user previously may indicate: a team, a type of wager, an amount of wager, and/or a specific player. This information may be used to select prospective wagers to present to the user in the future. In some embodiments, rather than television service provider system 110 managing such historic wager information, such information may be stored and managed by electronic sportsbook provider system 150. Electronic sportsbook provider system 150 may use such data to suggest particular wagers for the user; indications of such specific wagers may be provided to ticker engine 360 via sportsbook API 310.

Viewing history database 346 may be used to store indications of television channels and/or specific sporting events viewed in association with a television service provider system user account. For example, using data retrieved from content server system 160, television service provider system 110 may be able to equate watching a particular television channel at a particular time with viewing particular teams and sporting event. Data can be compiled on the sports, teams, players, types of games (e.g., Sunday Night Football, Monday Night Football, NCAA Tournament) and/or television channels that has historically been viewed in association with the user account. A user may typically be more interested in placing a wager on sporting events that the user watches. Therefore, providing prospective wager information on sports, teams, players, and types of games that the user is interested in may result in a higher conversion rate to the user placing a wager via electronic sportsbook provider system 150.

To incentivize the participation of the sportsbook provider, the television service provider may guarantee the sportsbook provider at least a number of prospective wager slots in the wager interface. By placing these prospective wagers in front of a user while the user is watching a live sporting event, the user may be inclined to place a wager. The sportsbook provider, as previously detailed, may use various factors to select the wagers to offer to the user. In some embodiments, the sportsbook provider receives viewing information from system 110 that indicates the current sporting event being viewed by the user and/or historic viewing events viewed in association with the user account. Electronic sportsbook provider system 150 can then make a determination, based on such information, which prospective wagers should be presented to the user.

Figure 4:
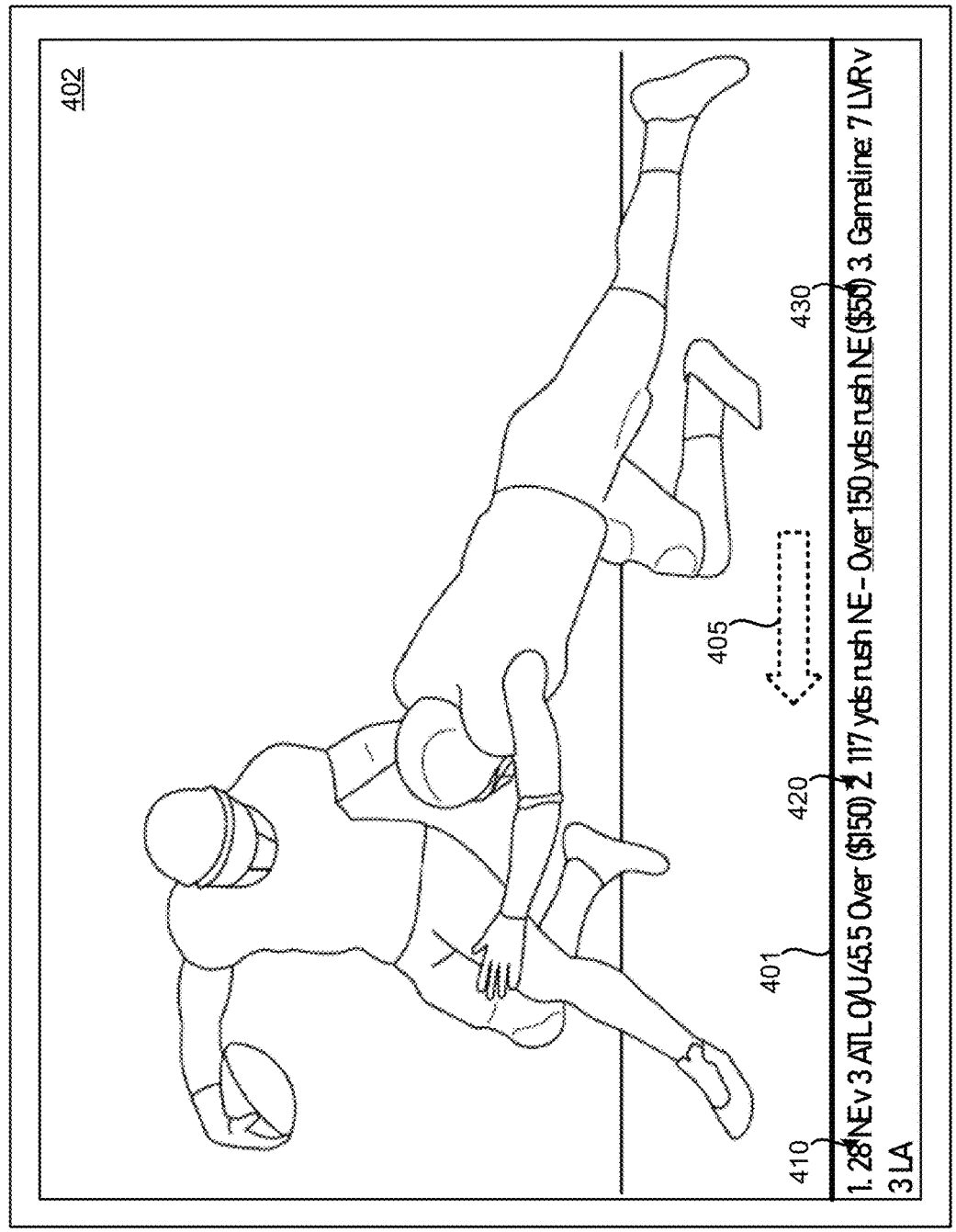
FIG. 4 illustrates an embodiment of live television augmented with account-specific wager data.

FIG. 4 illustrates an embodiment 400 of live television augmented with an account-specific wager interface. Embodiment 400 includes a scrolling ticker-style wager interface 401. A user can provide input indicating whether the wager interface is to be presented. In some embodiments, interface 401 is overlaid on content 402. In other embodiments, a reduced portion of the display device is used to present content 402 to allow room for interface 401, without any portion of content 402 being covered. Such an arrangement may be particularly useful if content 402 includes its own ticker, such as for scores, statistics, and upcoming events. Scrolling ticker-style wager interface 401 may scroll in a particular direction at a fixed speed, such as indicated by arrow 405. In other embodiments, "pages" of wager information may be presented on interface 401. Which style interface is used may be based on a user preference.

Interface 401 presents various active and prospective wagers that are interspersed. Wager 410 is: "28 NE v 3 ATL O/U 45.5 Over ($150). Wager 410 is an active wager that was placed by the user using a linked electronic sportsbook provider system account. Wager 410 indicates: the teams involved in the wager; the current score; the type of wager (over/under); the total points on which the wager is based (45.5); the user's chosen side of the wager (over); and the amount wagered by the user ($150). Additional or less information may be presented in other embodiments, such as the odds, the current play, time remaining, etc. Wager 420 represents a prop bet placed by the user. Wager 420 is: "117 yds. rush NE—Over 150 yds. rush NE ($50)." Wager 420 indicates: the current statistic (NE has 117 yards rushing); the user's wager (that NE will have over 150 yards rushing; and the amount wagered by the user ($50). Over time, these wagers may scroll as indicated by arrow 405. Wager 430 represents a potential wager that has not yet fully scrolled onto interface 401.

Figure 5:
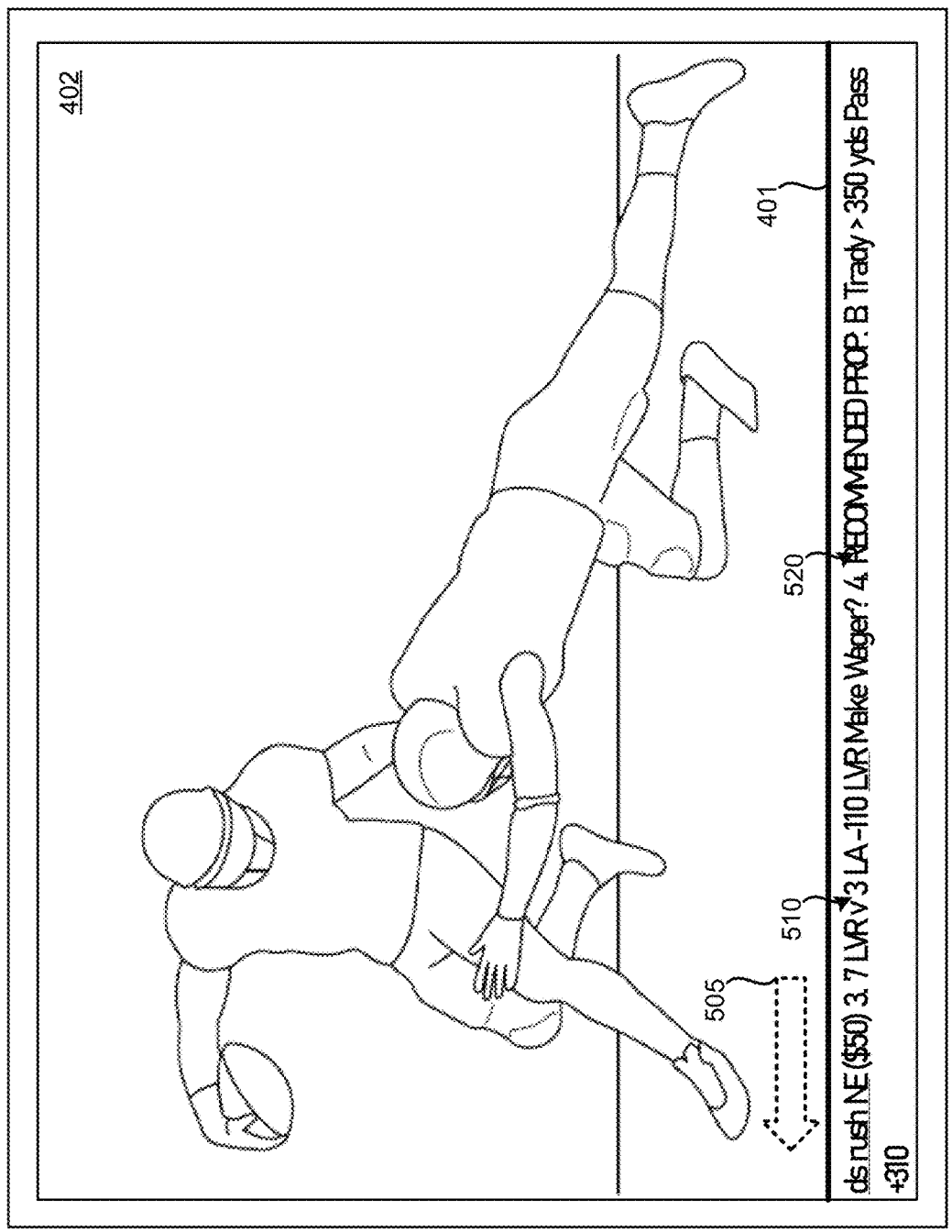
FIG. 5 illustrates an embodiment of live television augmented with viewing history-based wager data.

FIG. 5 illustrates the embodiment of live television augmented with the account-specific wager interface of FIG. 4, with different wagers presented. Arrow 505 indicates that scrolling to the left has continued over time. Wager 510 represents a prospective wager that the user may be interested in placing. This wager can correspond to live sporting events of content 402; the television service provider system user account's viewing history; the sportsbook provider system user account's wagering history; and/or a wager promoted by the sportsbook provider system. Wager 510 is offering an in-progress wager of −110 odds on LVR over LA. In order to make the wager, the user may select wager 510 on screen or by opening an interface associated with wagering on the presentation device or a separate computerized device. As previously detailed, a wager may be staged via the interface, such that the user completes the transaction on a separate computerized device, such as a smartphone.

Wager 520 is a recommended prop bet on the current live event being presented by content 402. The user may have specified a preference to view prop wagers associated with the currently-presented live sporting event. In this example, Wager 520 is offering a wager on whether play B. Trady will pass for more than 350 yards in the game with odds of +310. Again here, the user may select the wager on the presentation device and either stage or complete the wager via the presentation device directly.

While FIGS. 4 and 5 focus on scrolling ticker-style interfaces, in other embodiments, wagers may be presented in other forms. For example, a listing of past, active, and prospective wagers may be presented as a sidebar. Wagers may occasionally be presented for a period of time, then hidden (e.g., presented for one minute, hidden for ten minutes). Based on metadata embedded in the content stream, wagers may only be presented during commercial breaks. Wagers presented may be dynamically updated when the user changes channel. Active and potential wagers that experience a change in odds may be presented to the user to encourage the user to make the wager.

Figure 6:
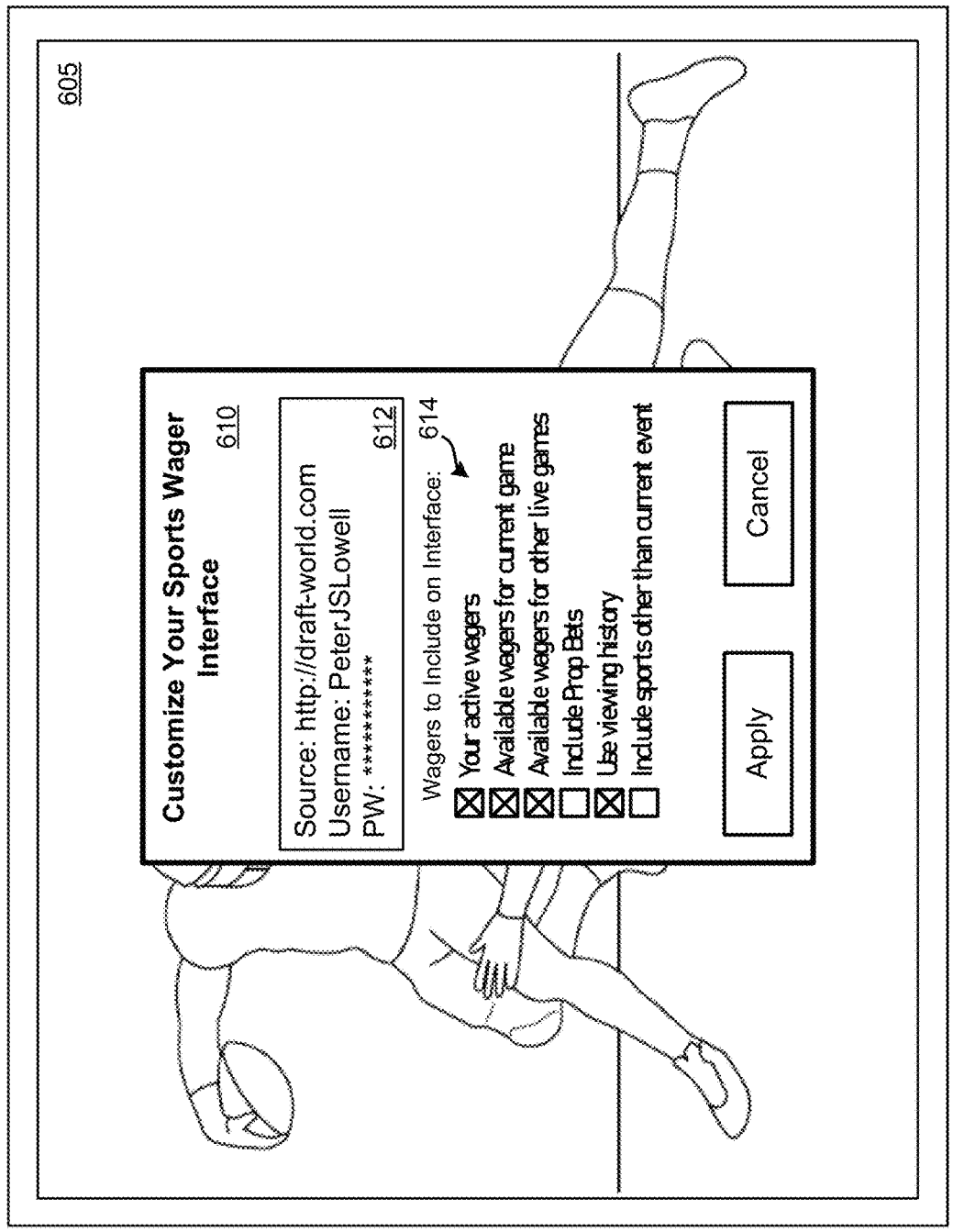
FIG. 6 illustrates an embodiment of an interface through which a live television augmented interface is customized.

FIG. 6 illustrates an embodiment 600 of an interface 610 through which a live television augmented interface can be customized. Interface 610 may be presented as an overlay over content 605 in other embodiments, interface 610 will be presented as an interface in some form other than an overlay. Interface 610 can allow a user to provide credentials that allow wager information to be retrieved from one or more electronic sportsbook provider systems. In the illustrated embodiment 600, the user has provided a username and password for a particular electronic sportsbook provider. In other embodiments, credentials may be provided for multiple sportsbook providers. By providing the users username and password in region 612, the television service provider system can access and retrieve wagering information from the user's account. This information can include: active wagers of the user, future wagers made by the user, historical wagering history, and recommended wagers from the electronic sportsbook provider.

In region 614, the user can select particular categories of wagers to appear or not appear in the user's sports wager interface. Several examples of possible options that may be customized by the user are illustrated. For example, a user may select whether or not his personal active wagers (with the active sportsbook provider of region 612) are to be presented. The user may be able to select whether available wagers (e.g., prop wagers) for the output live sporting event should be presented. The user may be able to select whether or not wagers on other currently-live games (which may or may not be presented on other television channels) should be presented. The user may be able to select whether prop wagers should or should not be included. The user may be able to specify whether his viewing history should factor in to potential wagers listed. The user may be able to select whether or not active and/or prospective wagers on sports other than the currently-being-presented sport should be included on the interface. The user may be provided with other options for controlling the types of historic, active, and prospective wagers presented.

Figure 7:
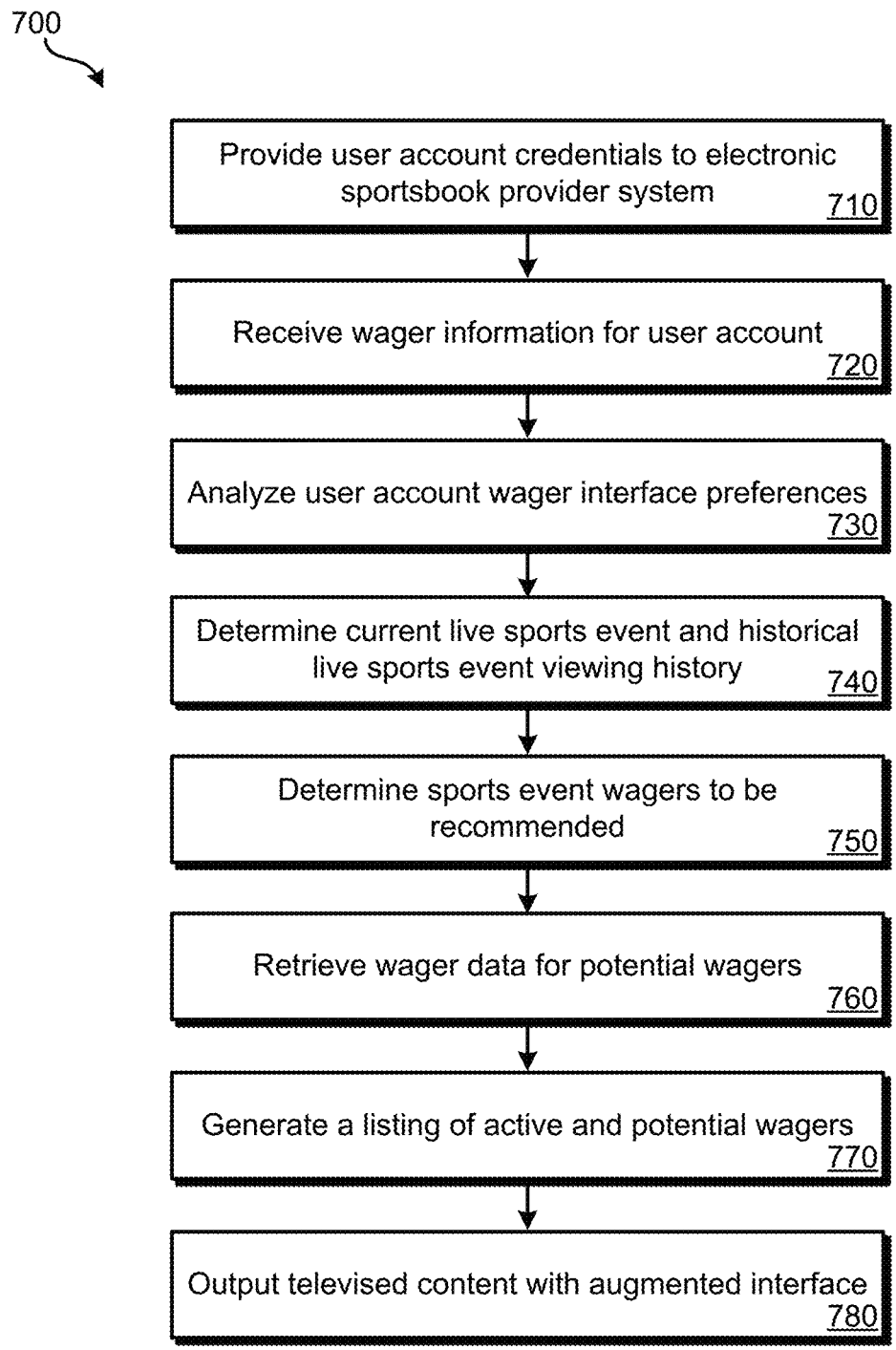
FIG. 7 illustrates an embodiment of a method for providing live television augmented with account-specific wager data.

Various methods may be performed by the systems of FIGS. 1-3. FIG. 7 illustrates an embodiment of a method 700 for providing live television augmented with account-specific wager data. Method 700 may be performed using system 100 of FIG. 1. The television service provider system 110 may function as detailed in FIG. 3 and might function as part of a satellite-based television service provider system as detailed in FIG. 2.

At block 710, the user account may provide credentials to the electronic sportsbook provider system. In response to receiving the user account credentials, following authentication, the electronic sportsbook provider system may perform a look-up to determine: historic wagers that have been placed through the user account; current active wagers placed through the user account; and future wagers placed through the user account. The electronic sportsbook provider system may also determine one or more wagers that the electronic sportsbook provider desires to promote to the user associated with the user account. These one or more prospective wagers may be wagers that the electronic sportsbook provider expects that the user will be interested in and may place a wager on. These prospective wagers may be based on: the user's historic, active, and future wagers (e.g., particular sports of interest, particular teams of interest, types of wagers, days of the week); and current promotions by the sportsbook provider.

At block 720, the wager information for the user account may be retrieved by the television service provider system. As detailed in relation to block 710, the retrieved wager information can include: historic wagers that have been placed through the user account; current active wagers placed through the user account; and future wagers placed through the user account; and, possibly, the prospective wagers selected by the electronic sports book provider.

At block 730, user account wager interface preferences may be analyzed. This may include analyzing settings such as those discussed in relation to FIG. 6 to determine the categories of wagers that are permitted to be presented to the user as part of the interface.

At block 740, the television service provider system may determine the current live sports event being presented by the television receiver or other content output device. If the user is currently viewing a television channel that does not correspond to a live sports event, the television channel may not be factored in to the particular wagers presented to the user. Additionally or alternatively, historic live sports event viewing history associated with an account (which is a separate account from the sportsbook provider system account) with the television service provider system can be retrieved. This historic live sports event viewing history can be used by the television service provider to identify prospective wagers that the user may be interested in. These wagers may be based on: a team the user has historically followed; a sport the user has historically followed; a television channel that the user historically watches (and games scheduled for broadcast on this channel); days of the week the user typically watches sports, etc. Based on this historic viewing information, the television service provider may determine specific sports games that are upcoming and fit the user's historic viewing patterns.

At block 750, the television service provider may determine one or more prospective wagers based upon the analysis of block 740. In some embodiments, rather than identifying prospective wagers, the television service provider may only determine the prospective events that the user is likely to view. In such embodiments, the electronic sportsbook provider system may determine the most likely wagers that the user will make, while the television service provider system is determining the likely events that will be viewed. Therefore, a significant synergy is present between the television service provider system and the sportsbook provider system: each having unique information that can be used in combination to tailor prospective wagers for the user.

At block 760, the wager data (e.g., odds, types of wager) may be retrieved from the electronic sports book system by the television service provider system. This wager data is retrieved based on either specific wagers requested by the television service provider system based on block 750, or based on wagers requested to the electronic sportsbook system for specific teams, sports, television channels, etc., based on the user's viewing history.

At block 770, a listing of wagers that are to be presented via the sports wagering interface may be created. The listing may be permitted to have a maximum and/or minimum number of wagers. Wagers for presentation may be ranked, such as according to Table 1, where the ranking is listed in descending order.

TABLE 1

| Wager Type | Maximum Count | Minimum Count |
| --- | --- | --- |
| Active Wager | Unlimited | 0 |
| Sportsbook Provider Selected | 3 | 1 |
| Television Service Provider Selected | 3 | 0 |
| Completed Wagers (within last 24 hours) | 4 | 0 |
| Future Wagers (within next 48 hours) | 4 | 0 |
| Sportsbook Promoted | 2 | 1 |

In the example of Table 1, a user's active wagers for games in-progress may be ranked highest for inclusion as part of the interface. Next, the sportsbook provider may select some number of prospective wagers to present to the user, such as based on wagering history. Next, the television service provider may select prospective wagers to present to the user based on the user's viewing history and/or current game being viewed. In some embodiments, these wagers may be selected at least in part by the sportsbook provider based on viewing data provided by the television service provider. The interface may also present past wagers that have been completed (e.g., did the user win and, if so, how much did the user win) and future wagers set by the user. The sportsbook may be permitted to insert some number of promoted prospective wagers or programs that are not tied to viewing history or wagering history.

A ranking, such as that of Table 1, may be used to determine which wagers are to be presented. Additionally, the particular wagers to be included based on the ranking may be interspersed with each other, which may help keep the user engaged in watching the interface. For instance, the sportsbook promoted wager may be mixed in with the user's active wagers to make it more likely that the user views the sportsbook promoted wager.

At block 780, based on the listing created at block 770, the wagering interface may be created and output for presentation to the user. On some display devices, the user may be permitted to select a particular wager for more information. For instance, to enter into a prospective wager, the user may select the wager and either directly wager an amount or stage a wager that is then completed by the user using a different device and/or application.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for augmenting live television, the method comprising:
providing, by a television service provider system, user account credentials to an electronic sportsbook provider system;
receiving, by the television service provider system, active wager information mapped to the user account credentials, wherein:
the active wager information indicates a first wager made with the electronic sportsbook provider system for a user account corresponding to the user account credentials;
determining, by the television service provider system, a current live sports event being output for presentation at a content output device mapped to the user account credentials;

determining, by the television service provider system, an historical live sports event viewing history associated with the user account;

generating, by the television service provider system, a listing of one or more wagers to be output for presentation, wherein the listing comprises: 1) a first available wager for the current live sports event being output for presentation at the content output device, 2) a second available wager for a second sports event based on the historical live sports viewing history associated with the user account; and 3) the first wager made with the electronic sportsbook provider system for the user account based on the active wager information; and augmenting presentation of the current live sports event being output for presentation at the content output device with a ticker-style interface that outputs the listing of the first wager, the first available wager; and the second available wager.

2. The method for augmenting live television of claim 1, wherein the listing of the one or more wagers comprises at least one recommended wager based on historical wagers previously placed by the user account.

3. The method for augmenting live television of claim 1, wherein augmenting presentation of the current live sports event being output for presentation comprises a scrolling interface being presented simultaneously with the current live sports event.

4. The method for augmenting live television of claim 1, wherein the listing of the one or more wagers comprises a recommended prop bet for the current live sports event.

5. The method for augmenting live television of claim 1, further comprising:

determining a channel change command has been received;

determining, by the television service provider system, a second current live sports event being output for presentation at the content output device mapped to the user account credentials following the channel change command;

generating, by the television service provider system, a second listing of one or more wagers to be output for presentation at least partially based on the second current live sports event being output for presentation at the content output device and the active wager information; and augmenting presentation of the second current live sports event being output for presentation at the content output device with the second listing of one or more wagers.

6. The method for augmenting live television of claim 1, wherein the listing of one or more wagers, as output for presentation, intersperses potential wagers with active wagers of the user account.

7. The method for augmenting live television of claim 1, further comprising: transmitting, by the television service provider system, the currently live sports event and the listing of the one or more wagers to the content output device via satellite.

8. An augmented live television system, comprising:

a television service provider system that communicates with an electronic sportsbook provider system and a plurality of television receivers, wherein the television service provider system is configured to:

provide user account credentials to the electronic sportsbook provider system;

receive active wager information mapped to the user account credentials, wherein:

the active wager information indicates a first wager made with the electronic sportsbook provider system for a user account corresponding to the user account credentials;

determine a current live sports event being output for presentation at a content output device mapped to the user account credentials;

determine an historical live sports event viewing history associated with the user account;

generate a listing of one or more wagers to be output for presentation, wherein:

the listing comprises: 1) a first available wager for the current live sports event being output for presentation at the content output device, 2) a second available wager for a second sports event based on the historical live sports viewing history associated with the user account; and 3) the first wager made with the electronic sportsbook provider system for the user account based on the active wager information, and presentation of the current live sports event being output for presentation at the content output device is augmented with a ticker-style interface that outputs the listing of the first wager and the available wager.

9. The augmented live television system of claim 8, wherein the augmented live television system further comprises the content output device, wherein the content output device is configured to:

output the current live sports event augmented with the ticker-style interface that outputs the listing of the first wager and the available wager.

10. The augmented live television system of claim 9, wherein the content output device is a television receiver of the plurality of television receivers that receives the current live sports event via satellite.

11. The augmented live television system of claim 9, wherein the content output device is a streaming device that receives the current live sports event via the Internet.

12. The augmented live television system of claim 8, wherein the listing of the one or more wagers comprises at least one recommended wager based on historical wagers previously placed by the user account.

13. The augmented live television system of claim 8, wherein the listing of the one or more wagers comprises a recommended prop bet for the current live sports event.

14. The augmented live television system of claim 8, the television service provider system is further configured to:

determine a channel change command has been received;

determine a second current live sports event being output for presentation at the content output device mapped to the user account credentials following the channel change command; and generate a second listing of one or more wagers to be output for presentation at least partially based on the second current live sports event being output for presentation at the content output device and the active wager information, wherein the content output device augments presentation of the second current live sports event being output for presentation with the second listing of one or more wagers.

\* \* \* \* \*